US009881440B2

(12) United States Patent
Anning

(10) Patent No.: US 9,881,440 B2
(45) Date of Patent: Jan. 30, 2018

(54) APPARATUS FOR INVENTORY CONTROL

(71) Applicant: Bernard Edgar Anning, Berkshire (GB)

(72) Inventor: Bernard Edgar Anning, Berkshire (GB)

( * ) Notice: Subject to any disclaimer, the term of this patent is extended or adjusted under 35 U.S.C. 154(b) by 418 days.

(21) Appl. No.: 14/409,940

(22) PCT Filed: Apr. 3, 2013

(86) PCT No.: PCT/GB2013/000151
§ 371 (c)(1),
(2) Date: Dec. 19, 2014

(87) PCT Pub. No.: WO2013/190253
PCT Pub. Date: Dec. 27, 2013

(65) Prior Publication Data
US 2015/0187160 A1 Jul. 2, 2015

(30) Foreign Application Priority Data
Jun. 20, 2012 (GB) .................................. 1210956.7

(51) Int. Cl.
*G06F 17/00* (2006.01)
*G07F 5/26* (2006.01)
(Continued)

(52) U.S. Cl.
CPC .................. *G07F 5/26* (2013.01); *G07F 9/02* (2013.01); *G07F 9/026* (2013.01); *G07F 13/02* (2013.01); *G07F 13/04* (2013.01); *A61J 7/0084* (2013.01)

(58) Field of Classification Search
CPC .... G06Q 10/087; B67D 1/0042; A61J 7/0084
(Continued)

(56) References Cited

U.S. PATENT DOCUMENTS 3,722,650 A 3/1973 Buescher
3,752,357 A 8/1973 Harris
(Continued)

FOREIGN PATENT DOCUMENTS

DE 4224088 A1 1/1994
DE 102007054431 A1 5/2009
(Continued)

OTHER PUBLICATIONS

International Search Report for PCT/GB2013/000151 dated Oct. 10, 2013.

*Primary Examiner* — Hunter Wilder
(74) *Attorney, Agent, or Firm* — Heslin Rothenberg Farley & Mesiti P.C.

(57) ABSTRACT

The invention provides an apparatus for controlling and monitoring the storage and dispensing of beverage products; the apparatus comprising: a plurality of product registration devices for registering the presence of beverage products in one or more storage locations, each product registration device being associated with one beverage product or group of beverage products; a plurality of metering dispensers in a sales location from which one or more authorized users can dispense beverage products to customers; a plurality of locking means for preventing dispensing of a beverage product, each locking means being operatively linked to a different one of said metering dispensers; a plurality of user identifying devices for identifying authorized users, each user identifying device being operatively linked to a different one of said locking means so that an authorized user can unlock the said locking means and thereby dispense a beverage product from an operatively linked 'metering dispenser; and a processor which receives and processes data from the said product registration devices, the user identifying devices and the metering dispensers and records the placing of beverage products in the one or more storage
(Continued)

locations, the transfer of beverage products from the one or more storage locations to the sales location; and the dispensing of beverage products from the metering dispensers by authorized users; and calculates the total value of each customer transaction made by each authorized user. Two locks or safeguards are provided to prevent unauthorized removal of an optic element. The locks are interlocked.

15 Claims, 12 Drawing Sheets

(51) Int. Cl.

| | |
|---|---|
| ***G07F 9/02*** | (2006.01) |
| ***G07F 13/02*** | (2006.01) |
| ***G07F 13/04*** | (2006.01) |
| *A61J 7/00* | (2006.01) |

(58) Field of Classification Search
USPC .................................... 705/28, 414; 700/231
See application file for complete search history.

(56) References Cited

U.S. PATENT DOCUMENTS

| | | | | |
|---|---|---|---|---|
| 3,863,724 | A | 2/1975 | Dalia, Jr. | |
| 3,940,019 | A * | 2/1976 | Kross | B67D 1/0041 222/108 |
| 5,769,271 | A | 6/1998 | Miller | |
| 5,913,454 | A | 6/1999 | McHale | |
| 5,988,859 | A | 11/1999 | Kirk | |
| 2003/0109956 | A1 | 6/2003 | Spano et al. | |
| 2008/0147211 | A1 | 6/2008 | Teller | |
| 2009/0224000 | A1 | 9/2009 | Lopez et al. | |

FOREIGN PATENT DOCUMENTS

| | | | |
|---|---|---|---|
| EP | 0340420 | A1 | 11/1989 |
| EP | 0586330 | A1 | 3/1994 |
| FR | 1208974 | A | 2/1960 |
| GB | 2369347 | A | 5/2002 |
| WO | 93/25466 | A2 | 12/1993 |
| WO | 97/32284 | A1 | 9/1997 |
| WO | 2002/042199 | A1 | 5/2002 |
| WO | 02/056265 | A1 | 7/2002 |
| WO | 2008/035250 | A1 | 3/2008 |

* cited by examiner

Bottle with screw top as Top Sealer

Bottle with Cork as Top sealer

APPARATUS FOR INVENTORY CONTROL

CROSS REFERENCE TO RELATED APPLICATIONS

This application is a national stage filing under section 371 of International Application No. PCT/GB2013/000151, filed on Apr. 3, 2013, and published on Dec. 27, 2013 as WO 2014/190253 A1, which claims priority to British Application No. 1210956.7, filed on Jun. 20, 2012. The entire contents of each of said applications are hereby incorporated herein by reference.

This invention relates to an apparatus for inventory control and in particular an apparatus for use in an establishment such as a bar or hotel where alcoholic and other beverages are served.

BACKGROUND OF THE INVENTION

In establishments such as bars, public houses and hotels where alcoholic and other beverages are served, it is commonplace to use Electronic Point Of Sale operating systems (EPOS) to record sales and payments made by customers. A problem with the EPOS systems currently in use, even those making use of touch screen technology, is that inputting sales data into the systems is a very time consuming operation which must be carried out manually by a bar person or other operative following each sale. A further problem is that there are ample opportunities for information about purchases to be entered incorrectly, with the result that the data recorded can be inaccurate, unreliable and incomplete.

There is therefore a need for an automated system to overcome the short falls in the present manually operated postings required by todays EPOS Electronic Point Of Sale operating systems and which makes use of non-manual interventions for downloading sales process In particular, there is a need for a system which requires all dispensing components to be disabled and locked only to be enabled and unlocked once an authorised person has been given consent; product identification and quantification being automatically dispatched to the till with the users (ID).

In bars, public houses, restaurants, hotels and similar establishments, alcoholic beverages such as whiskey, rum, brandy, gin and the like are typically dispensed in a standard free pour measure or optic which are stand-alone devices for manually dispensing specific volumes of liquids, The standard optic, which has been adopted throughout the licensed trade for dispensing beverages, is operated by a bar person placing a receiving glass under its outlet and manually pushing the operating lever in an upward direction to a stop point that releases the product. Once the product has been dispensed, the bar person removes the upward pressure to the operating lever, thereby allowing it to return to its original refill location.

Whilst the optic has a government seal of approval ensuring the correct volume of beverage is dispensed with each operation of the device, none of the dispensing apparatuses employed in the trade are designed to ensure the cost of each sale is automatically registered into the till. The responsibility for recording each sale is typically reliant on staff fulfilling their duties in an honest and diligent manner and is therefore open to dishonesty (theft) and errors which can lead to substantial losses in revenue for the industry, as well as a lack of knowledge as to true stock levels which in turn may result in expensive frequent audits.

To overcome the aforesaid problems, it would be desirable to create a procedure that would control the operational sequence of dispensing the products and automatically inform the till of the activities undertaken for costing.

My earlier patent application, PCT/GB01/05119 (see in particular page 9 from line 18 through to page 11 line 21), discloses a device that operates an electrically operated locking device connected to the optic and a magnetically operated switch located within a specific position attached to the optic to provide a counting facility both components connected permanently to the optic.

Whilst the system described in my earlier application goes some way towards addressing the problems discussed above, it does nevertheless suffer from a number of further disadvantages and problems. For example, the locking device for the optic described above makes it difficult for the Standard Optic to be subjected to the normal weekly cleaning routine. For a cleaning operation to be undertaken it is necessary to protect the products from the ingress of water requiring additional expense and not necessarily securing a satisfactory conclusion. Furthermore, changes to the function of the optic as described on page 10 lines 29 through too page 11 lines 21 and the magnetic switching device are sought due to the fact that the counting procedure would be inaccurate and insecure.

The magnet being an addition/attachment to a standard Optic leaving the possibility when the optic was changed for cleaning being changed with an optic without a magnet, or the magnet was being unknowingly dislodged during operation or in the cleaning process making the optic the subject of unacceptable failure.

Should the bar person when dispensing the measured product partially released pressure on the operating lever from the top of its travel whilst still dispensing the product, would reduce the magnetic force on the switch disengaging and opening the contacts, then, by pushing the operating lever back to its top position would close the contacts again and dependant on how many times this rocking momentum went on without disturbing the flow of the product would determine how many additional beverages had been registered as dispensed.

A further failing with the operating procedure of the optic was, should the data carrier "I" button be removed from the electronic device (As stated in Line 19 Page 10) retainer prior to the optic completing its dispensing operation, the locking device would immediately be de-energised releasing the locking pins.

If this was prior to the operating lever reaching its closed position of rest the pins were released into an incorrect location disabling the operation of the optic and the electrically locking device resulting in repair or replacement being undertaken.

Restricting the operation of the optic too precise procedures could not be enforced and the unnecessary costly replacement of a modified optic due to the failure of either the optic or the attachments is unsustainable Whilst the invention has offered partial restriction on the unauthorised dispensing of product when operating in the correct mode, it failed to prevent the optic being removed from its normal clamp up righting the bottle and removing it from the optic taking quantities of the product direct from the bottle and replacing the bottle and optic to its clamp was not prevented The next item that requires consideration is the feature regarding beer monitoring it has been found that beer flow being monitored through the use of flow meters only when subjected to varying Beer viscosity, temperature, pressure, and fobbing become unstable. With no further means of calculation the system has been found wanting in accuracy To Measuring beverage dispensed at the dispenser will only provide details of the volumes dispensed under controlled environment and do not take into account the interaction between stock movements outside this environment for example stock delivery accuracy and stock removed from store rooms can all have an adverse account on the true picture.

To overcome this disadvantage all delivery and removal of stock need close electronic supervision and is covered in our invention.

Finally it is apparent that if a shelf connected to weighing devices located within a cabinet is loaded with different items with varying weights it was found that by adopting the principle of discriminating between brands using only the weight of the product for identification it was unable to complete the task correctly for example taking two bottles of beer each containing 360 ml each weighing 190 mg giving a total of 380 mgs it could not distinguish between the brand as the difference in weight was insufficient and their weight was never consistent using only the weigh caused further confusion as when then combined weight of two bottles with a total weight of 380 mgs could not distinguish whether this was 6, 4 or 3 bottles of another weight and could therefore using this principle limited the shelf to only have the same branded goods having the same weighted containers to work correctly

SUMMARY OF THE INVENTION

The present invention sets out to address and reduce or solve the problems discussed above.

According to the invention, there is provided an apparatus for inventory control verifying quantity and type of beverages delivered to stock by suppliers against electronic orders placed, identifying authorised user and quantifying beverages transferred from stock to pre-determined electronically identifiable sales locations, and at that and every specific sales locations it would be electronically registered and reported the total of products needing replacement, and electronically reporting the quantity of products that had been replaced.

By means of the apparatus of the invention, it is possible to determine and record electronically the difference between what has been removed from stock and what has been replaced in the sales area and reporting any discrepancies, electronic recognition and authorisation of the user prior to the execution of the transaction, identifying and quantifying beverages dispensed identifying authorised user in execution of a transaction, calculating the total value of beverages dispensed by each identified user and optionally verifies the amount of cash placed in and removed from the cash register in settlement for the transaction.

The apparatus of the invention overcomes problems associated with the present systems in use which are not designed to ensure all products ordered and paid for are received, and when distributed to the sales area are accounted for, are authorised when dispensed and automatically submitted to the till for payment by the person responsible for the sale and the resultant stock and sales dispatched to the appropriate ledgers. The apparatus therefore completes for the first time the purchase to sales to accountability loop and requires substantially no manual stock or sales intervention.

The invention provides an apparatus for the controlling, verifying, quantifying, and recognising types of beverages delivered for stock, transferred from stock to identified sales locations, controlling dispensing of beverages, overcoming the aforementioned disadvantages. The apparatus of the invention provides information to transactions that are currently on going as well as those that have already been completed.

According to the invention, only authorised user identification access will be possible to secured areas where beverages are stored. Removal of stock to replenish depleted sales stock is undertaken from a statement of items needing replacement produced by the system from information gathered from the individual dispensing components that have reported the removal of the products.

Products are identified, quantified, and matched to the predetermined specific location defined within the sales location, with beverage movements being matched to the individual undertaking the action. Dispensed beverages are matched to the authorised individual user who dispensed the said beverage.

This dispensing beverage operation is possible even when the apparatus is in simultaneous use by several users.

A cash register is operatively linked to a processor which receives the calculated total value of each transaction made by the user and displays the list of total sales for correlation by the bar person.

The invention provides a means of reporting real time sales and stock offering accurate instant accounts and P&L reports including management resource efficiency levels and Wage calculations, and when stock reaches minimum levels is automatically re ordered to stock levels set by management.

Accordingly, in a first aspect the invention provides an apparatus for controlling, calculating and confirming stock delivery, stock withdrawal, and controlling and monitoring the dispensing of beverages by one or more users, the apparatus comprising:

- a plurality of measuring devices to verify receipt, movement and allocation of stock;
- a plurality of adaptors for accommodating or housing fixed volume beverage dispensers;
- a plurality of metering dispensers for dispensing beverages;
- a plurality of locking means to prevent movement of stock and dispensing of beverages, each locking means being operatively linked to each one said security entrance and to each one said metering dispensers;
- a plurality of user identifying devices, each user identifying device being operatively linked to a different one of said locking means;
- a plurality of bottle stops to prevent loss of content when the bottle is inverted to be installed into the dispensing apparatus.
- a processor for receiving and processing data from said user identifying devices and monitoring stock movement and metering dispensers and calculating the total value of each transaction made by each user; and
- a cash register operatively linked to the said processor which receives the calculated total value of each transaction made by the user.

It is preferred that the cash register has an electrically operated lockable cash drawer that is capable of verifying the correct amount been placed there in settlement of the said transaction and preferably is capable of both counting money in and counting money out. Such means operate by weighing the cash or by reading characteristics indicia of the cash or a combination of the two examples.

It is preferred that the cash register is capable of verifying moisture levels in paper money and rectifying any inconsistencies thereby prevent errors in weight when placed in the cash drawer. Such means operate through heat or drying apparatus or a combination of both and further that the cash drawer is fitted with a means of maintaining the correct level of humidity.

The cash register is also provided with the means of manual input of transactions for the goods, such as food and beverages, not dispensed by metering dispensers of this invention.

A means of recording credit card and smart card transactions may also be linked to the cash register and/or the processor. In this way, the dispensing operation is monitored by the apparatus and consequently the user is unable to dispense beverages from the metering dispenser of the invention without subsequent payment undetected.

In another aspect, the invention provides an apparatus for controlling and monitoring the storage and dispensing of beverage products; the apparatus comprising:

- a plurality of product registration devices for registering the presence of beverage products in one or more secure storage locations, each product registration device being associated with one beverage product or group of beverage products;
- a plurality of metering dispensers in a sales location from which one or more authorized users can dispense beverage products to customers;
- a plurality of locking means for preventing dispensing of a beverage product, each locking means being operatively linked to a different one of said metering dispensers;
- one or more locking means for controlling access to the one or more secure storage locations, each locking means being associated with one storage location;
- a plurality of user identifying devices for identifying authorized users, each user identifying device being operatively linked to a different one of said locking means so that an authorized user can unlock the said locking means and thereby dispense a beverage product from an operatively linked metering dispense or enter one of the one or more secure storage locations; and
- a processor which receives and processes data from the said product registration devices, the user identifying devices and the metering dispensers and records the placing of beverage products in the one or more storage locations, the removal of beverage products from the one or more secure storage locations; and the dispensing of beverage products from the metering dispensers by authorized users; and calculates the total value of each customer transaction made by each authorized user.

The apparatus of the invention is particularly suitable for use in large bars where large quantities of stock are stored in secured areas and several barmen and bar woman are working at the same time.

Thus each bar person is provided with his or her user (DC) Data Carrier which can conveniently be carried on a magnetic, optical or electronic data carrier the can be read by a reader associated with a given beverage dispensing device. Alternatively the means of identifying a user may be by means of a personal electromagnetic radiation emitter or by fingerprint. Activating the user Data carrier device allows an authorised user to gain access to the drinks dispenser and at the same time sends information to the processor identifying the beverage dispensed and the user.

The user Data carrier (DC) device is instructed to allow access to the drinks dispenser only to authorised users preventing access to persons in possession of for example, stolen or lost data carrier or radiation emitter or to those persons otherwise barred from accessing the drinks dispenser.

The user identification authorisation code will vary depend and on what duties are being perform for instance to gain access to secure storage areas will require an higher level authorisation code than that required for access to beverage dispensing duties.

The quantity of beverage dispensed is measured by a metering device associated with the metering dispenser and the information relayed to the processor. When the user has finished dispensing the beverage the user (DC) device is deactivated, e.g. by removing the data carrier from the reader and the dispensing device can then be used by another user.

The user can then go to the cash register where the total of the transaction has been recorded against the user (DC) and once the user has identified themselves by inserting their (DC) into the receptor the cash register displays the itemised quantity on the touch screen it is preferred that the cash register has a user identifying (DC) device operatively connected thereto, the cash register being arranged to display the calculated total value of the said transaction upon identification of the authorised user by the device.

Thus although the cash register may hold details of the transaction prior to the (DC) device being activated, it will only display the total of the transaction for a given user upon activation of the User (DC) device by an authorised user. At this point the user will be given a choice of accepting the data displayed or declining same if accepted the sale is finalised if declined there will then be further alternatives to address as an example should the declined item be selected as a beer then four choices of why it is being declined will be displayed having identified the reason this data can be logged for future discussion, the beer is deducted from the total the sale can then be finalised and the transaction settled with the customer, at that point the transaction is electronically converted into the sales and stock ledger.

The advantage of the arrangement is that a number of users can use the cash register, each user activating their user (DC) device to display their transaction total when they are ready to settle the transaction with the customer. It can be envisaged that the processor can be combined within the cash register In order that each individual can keep track of the various dispensing operations and ensure that he or she has provided the customer with the correct number and type of drinks, a plurality of dispenser monitors may be provided, each of which can be programmed to display a running total of a transaction or series of transactions made by that user. Thus each user could be allocated their own individual display monitor or alternatively people working at the same bar could use a monitor that has been segregated into as many sections as bar persons working the bar.

The metering dispensers can be any type of dispensers typically found in bars. For example, the dispensers can be the fixed volume spirit dispensers (for example of the type sold by Gaskell & Chambers under the trade mark Optic) or they can be draught beverage dispenser such as beer dispensers, e.g. for dispensing beer under pressure or by hand-pulled pumps or draught or soft drinks dispenser for dispensing drinks such as fruit juices and carbonated drinks.

Or an extendible multi stacked container system for draught dispensing.

The dispensers can also take the form of cabinets such as cold cabinets and ambient temperature cabinets, containing beverages such as beer, cider, wine, and fruit juices and cordial or mixed drinks contained in either glass bottles or cans.

In general at least two fixed volume spirit dispensing adaptor apparatus each to accommodate a fixed volume spirit dispensers, and typically more than two adaptors will be each located for housing fixed volume beverage dispensers, each adaptor being securely fixed to a wire race way location and will be located into its own associated counting and locking means.

The nature of the locking device will depend on the nature of the metering dispenser. For example if the metering dispenser is a fixed volume spirit dispenser, the locking means can be an electro-mechanical device that immobilises a dispensing arm or lever on the dispenser. The electro-mechanical device can be a solenoid-based device, the solenoid serving to actuate a locking element to bring it into or out of locking engagement with the dispensing arm or lever. Actuation of the solenoid is controlled by the user ID device has recognised a user.

Accordingly, in a further embodiment, the invention provides an electro-mechanical locking device for attachment to a fixed volume spirits dispenser and use in conjunction with a user identifying device and apparatus as here in before defined, the locking device comprising a housing and means for lockably attaching the housing to the fixed volume spirits dispenser; the housing containing an electromechanical locking element for engaging a dispensing arm or lever of the fixed volume dispenser to restrict movement thereof and prevent dispensing of the spirits, the electromechanical locking element being actuable when an authorised user is identified by the user identifying device thereby to disengage the dispensing arm or lever of the dispenser to permit dispensing of the beverage.

In one embodiment, the electro-mechanical locking device is provided with electronic communication means for communicating with the processor of the apparatus, and a plurality of switches which are opened or closed in response to movement of the dispensing arm or lever of the fixed volume dispenser and wherein the opening and closing of the switches generates signals which are transmitted via the electronic communication means to the processor and which indicate the volume of spirits dispensed from the dispenser.

When the dispensing device is for a secure storage area with electronic monitoring of dispensing draught beverage such as beer and lager with electronic numerated and itemised beverages stored, the locking means can simply take the form of an electronic locking mechanism by which the access is either enabled or disabled depending upon whether the user (DC) device has authorised the user.

When the dispensing device is for dispensing draught beverage such as beer the locking means can simply take the form of an electronic locking mechanically operated valve by which the dispensing device is either enabled or disabled depending upon whether the user (DC) device has authorised the user.

Where the dispensing device is a secure area or a cabinet, the locking device can take the form of a lock preventing the secure area or cabinet door from opening.

When the dispensing device is a draught multi-bottle pumped dispenser the locking mechanism by which the dispensing device is either enabled or disabled depending upon whether the user ID device has recognized a user.

In order to allow volumes or units of beverage dispensed to be recorded, each dispensing device will have associated there with a means of monitoring the amount of beverage dispensed. In the case of a fixed volume dispenser, this can take the form of a counting device that counts each volume dispensed. In the case of a draught beer dispenser, the monitoring means can take the form of a flow meter combined with a weighting device that determines the fluid flowing through the supply line leading to the dispenser combined with the reduction of weight recorded in the product storage container. In the case of a cabinet, the monitoring means can take the form of a weighing device that records a change in weight of a tray and relates this to the removal of a particular beverage. Such a weighing device can be, for example, be an analogue or digital load cell, or strain gauge.

The apparatus of the invention comprises a plurality of product registration devices for registering the presence of beverage products in one or more secure storage locations, each product registration device being associated with one beverage product or group of beverage products.

The secure storage location is typically a room, cupboard or container located in the same building as the sales location. It may, for example, be a cellar or store room. Access to the secure storage location is controlled by a locking means and in particular an electronic or electro-mechanical lock which is linked electronically to the processor. A user identifying device is associated with or linked to the electronic or electro-mechanical lock so that an authorised user may gain access to the secure storage location.

Inside the secure storage location, beverage products are stored on or in a product registration device which is linked electronically to the processor. Typically a separate product registration device is associated with each beverage product or group of beverage products. The product registration device detects the presence or absence of beverage products and communicates this information to the processor. Thus the processor receives information about additions of stock to the secure storage location and removal of stock from the secure storage location. Additions of stock to the secure storage location can be electronically correlated with fulfillment of an order placed for new stock, and removals of stock from the secure storage location can be correlated with the addition of beverage products to one or more of the metering dispensers. Each of the product registration devices typically is associated in the processor with a particular location and a particular type of product.

The product registration device is preferably a tray upon which the beverage product or group of products rests, the tray having an associated weighing device such as a load cell or strain gauge so that the addition or removal of a beverage product can be detected as a change in weight on the tray.

Each tray will typically carry only one beverage product or linked group of products. Examples of linked groups of products include cases or half cases of wine, cases of beer and trays of beer cans.

The trays can vary in size, for example from trays intended to carry only single bottles of wine or beer to trays intended to carry a keg of beer. A keg of beer in the secure storage location can be connected to a metering dispenser in the sales location. The volume of beer dispensed can thus be monitored either by conventional measuring means (e.g. a flow meter in the line connecting the keg with the dispenser or by means of the change of weight of the keg as measured by the weighing device associated with the tray or as a combination of both.

In a further aspect, the invention provides a beverage storing and dispensing system comprising an apparatus as hereinbefore defined and a stock of beverage products, the stock of beverage products being recorded in an inventory stored on an electronic storage device or medium associated with the processor, a proportion of the stock of beverage products being stored in the one or more storage locations and a proportion of the stock being connected to the plurality of dispensing devices; wherein each of the beverage products forming the proportion of the stock in the one or more storage locations is located on a tray having an associated weighing device which registers the weight of the beverage product and detects removal of the beverage product from the tray and transmits to the processor information enabling the processor to determine the quantity and type of beverage products removed from the tray. The process of this data can be used for the till to calculate sales totals or for the data base to evaluate stock levels sales totals and provide management information.

BRIEF DESCRIPTION OF THE DRAWINGS

The invention will now be described in more detail and illustrated, but not limited, by reference to the particular embodiments shown in the accompanying drawings in which.

10*a* a view of when the adaptor is in location with flexible fingers and teeth fitting into the bottle recess.

10*b* a view of when the adaptor is in location with flexible fingers and teeth fitting into the bottle recess and the outer securing ring is in place

10*c* a view of when the adaptor is in its final location with the two semi-circular swivelling extended hand operated closing apparatus having been securely fixed against the structure of the bottle stopper.

Figure 11:
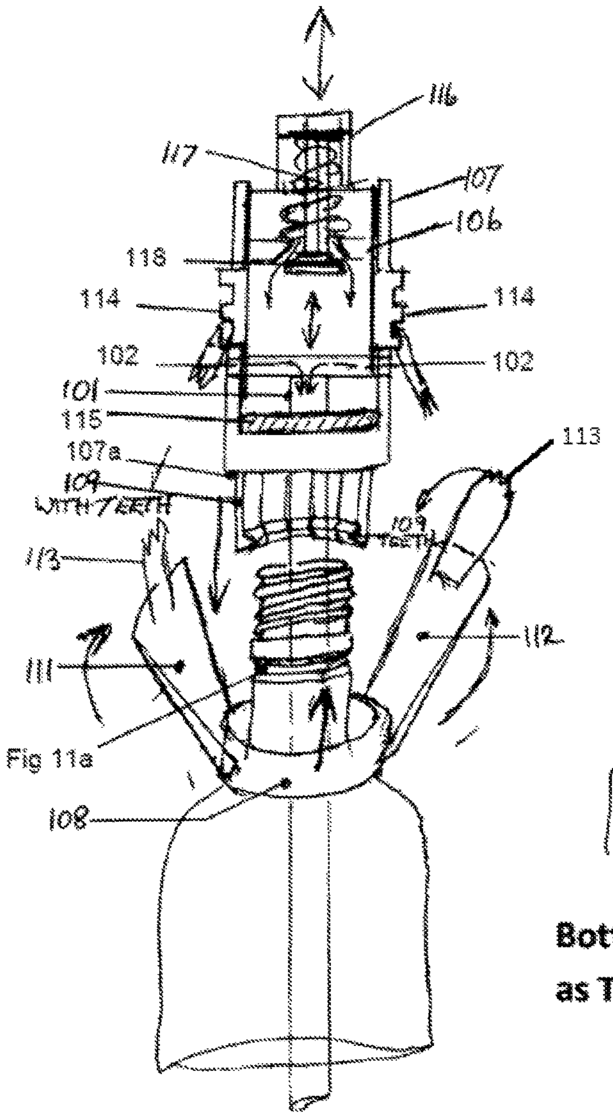

FIG. 11 is a cross section of the screwed topped recess for a bottle top sealing adaptor.

Figure 11A:
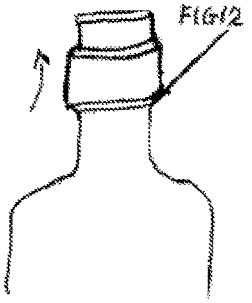
Figure 12:
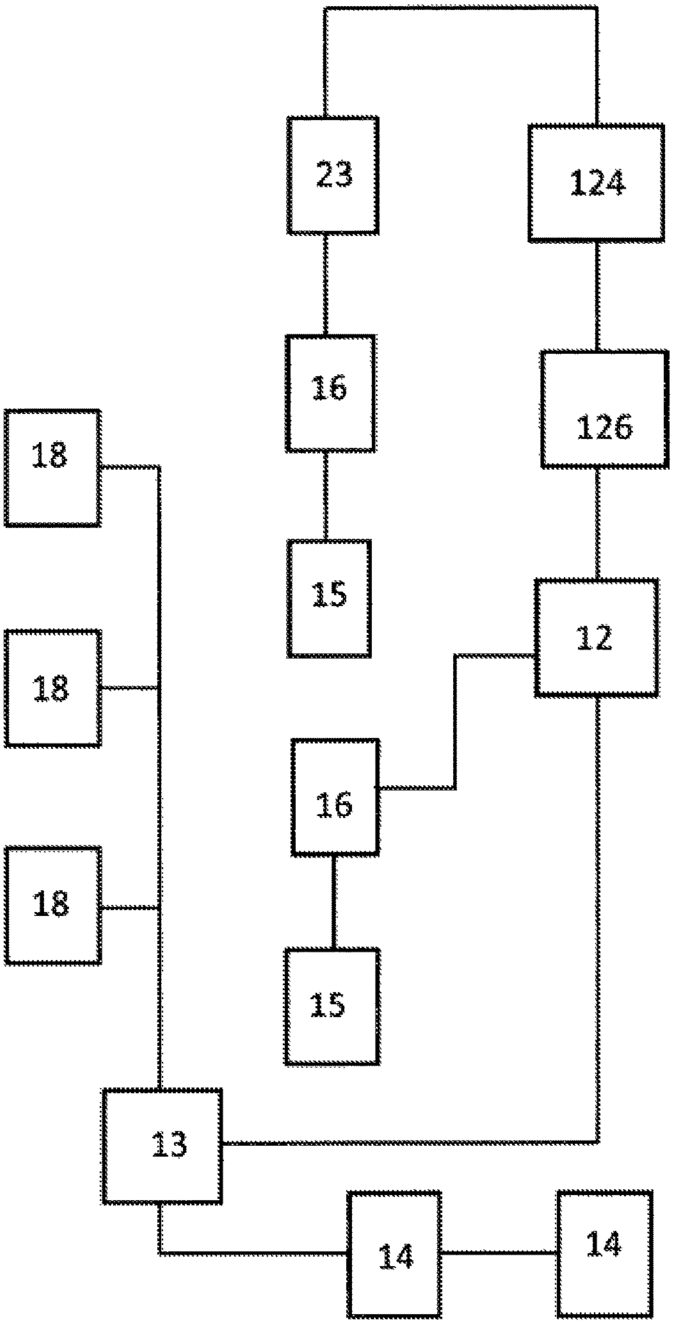
Figure 13:
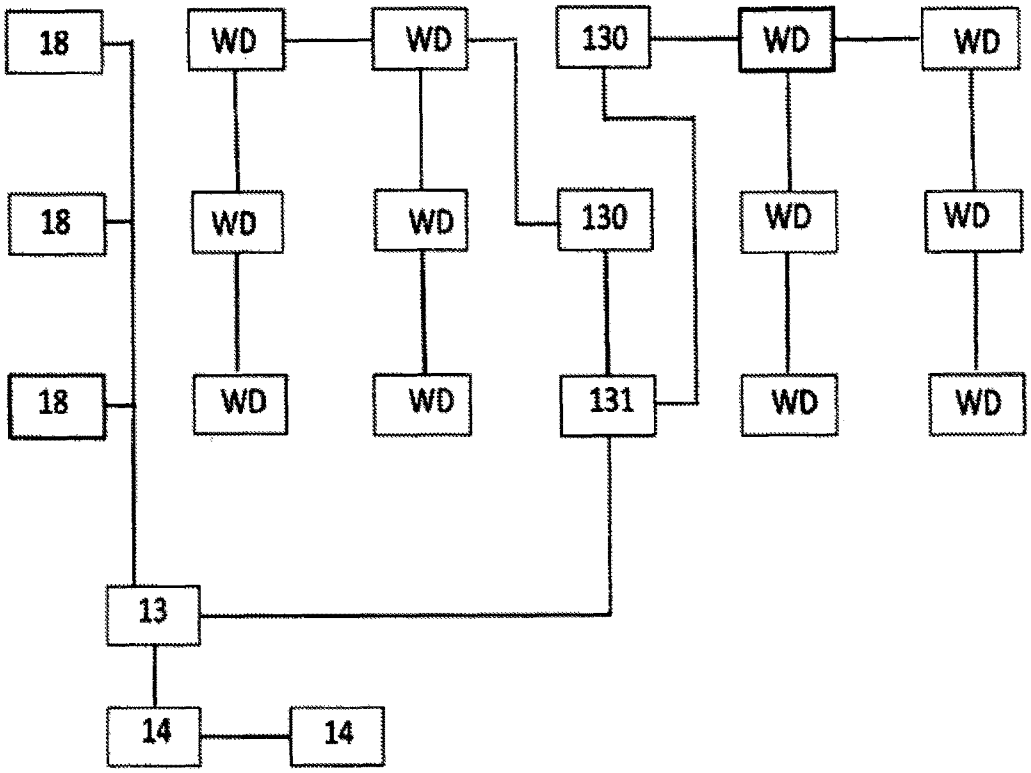
Figure 14:
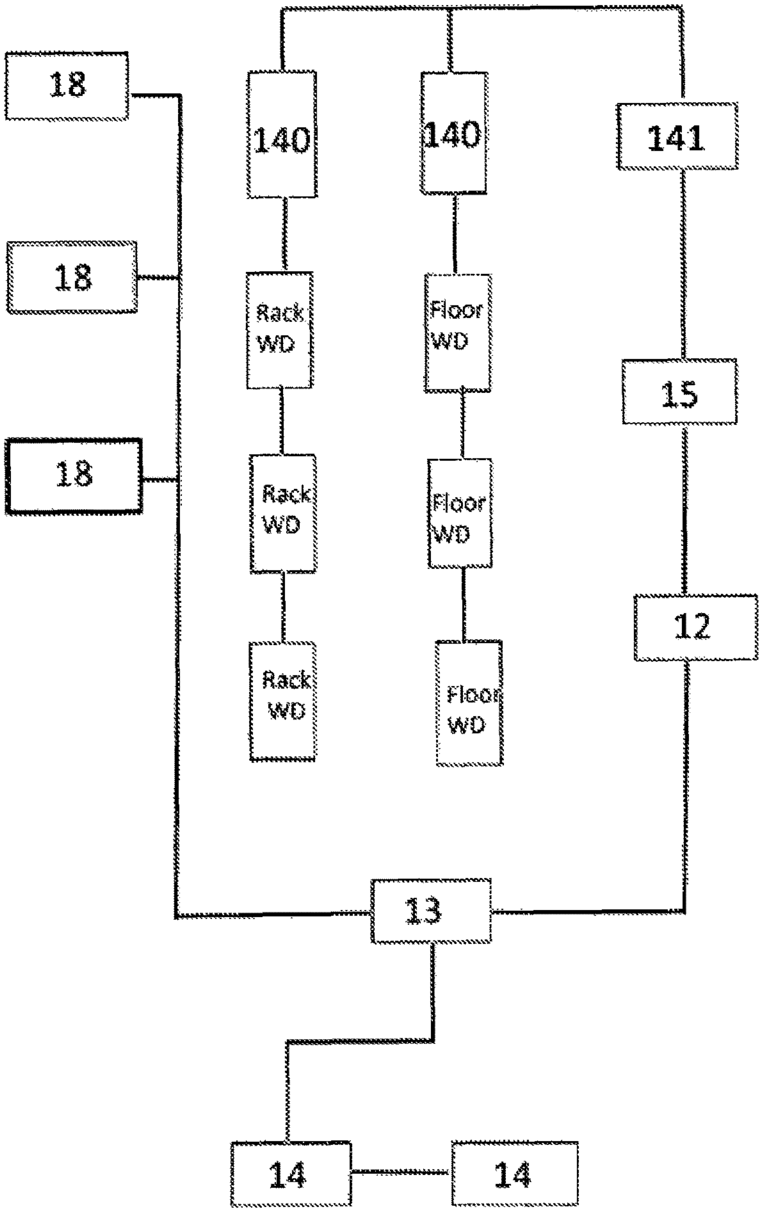

FIG. 11*a* is a cross section of the corked topped recess for a bottle top sealing adaptor FIG. 12 is a schematic view of a Multi Stacked Container Dispensing Apparatus according to one embodiment of the invention FIG. 13 is a schematic view of apparatus for a cabinet dispensing according to one embodiment of the invention FIG. 14 is a schematic view of apparatus for Secure Storage dispensing according to one embodiment of the invention

DETAILED DESCRIPTION OF THE PREFERRED EMBODIMENTS

Figure 1:
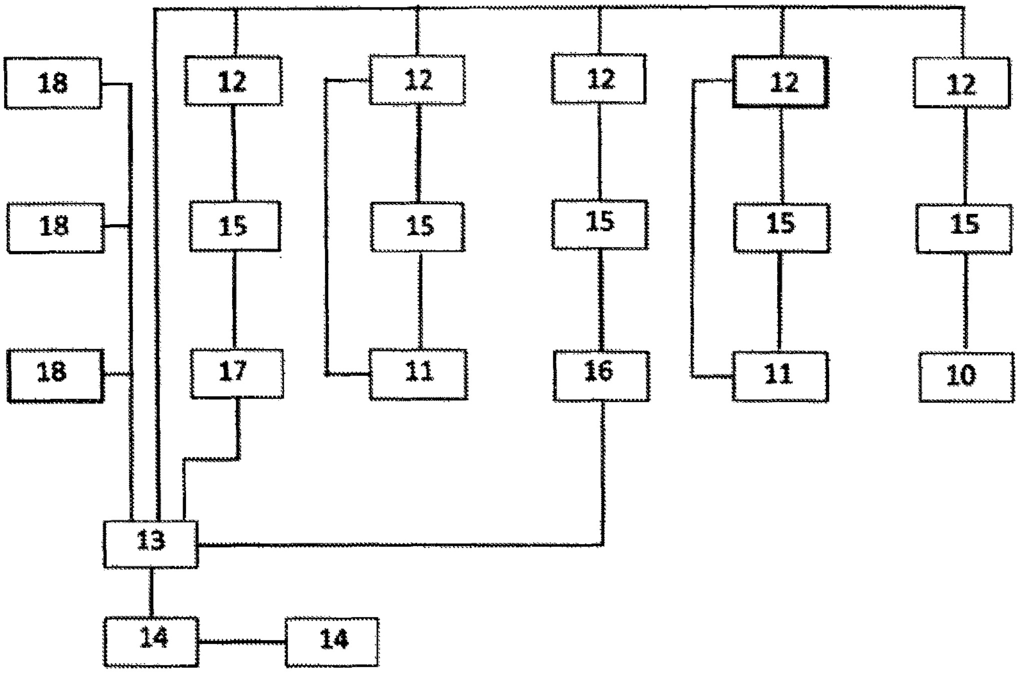
FIG. 1 is a schematic view of apparatus for dispensing beverages according to one embodiment of the invention.

FIG. 1 illustrates the basic structure of an apparatus according to one embodiment of the invention. The apparatus comprises secure storage area forming part of or within the building structure 17, plurality of beverage metering dispensers 10, 11, 16 and 18 a plurality of locking devices 15, for preventing dispensation of beverages from secure storage areas 17 and dispensers 10, 11, 16, and 18 each locking device being operatively linked to a different one of said metering dispensers.

The dispensers 10 and 11 can be any of the types of dispensers commonly found in bars such as fixed volume dispensers for beverages such as spirits, or a draught liquid dispenser for beverage such as draught beer, and dispenser 16 and 18 can comprise a cabinet for bottled beer or any other beverage suitably stored in a cabinet. 17 can comprise a secure cellar or storage area constructed from or within the building for storage of barrelled beers being larger, real ale, bottled beer or all other beverage suitably stored The apparatus further comprises a plurality of user (DC) devices 12, each being operatively linked to a different locking device 15. User device 12 unlocks locking device 15 on identification of an authorised user. Each dispenser is operatively linked in series, in this case via a communications bus such as a type RS 485 to processor 13 via their respective user (DC) devices. Dispenser 16 and secure storage area 17 are additionally connected, in this case via a separate communications bus such as a type RS485 directly to processor 13. Processor 13 is further operatively linked in this case via a communications bus such as a type RS 485, to a cash register 14 which can be operated via user ID device 18.

In this embodiment the maximum number of user (DC) devices which can be connected in series via an RS 485, directly to processor port is 31, each one allocated an address from 0-30. An apparatus can be envisaged comprising more than 31 user (DC) devices connected in series to a single port. In this embodiment the maximum number of ports is 9. Each one allocated an address from integers 1-9. Again an apparatus can be envisaged comprising more than 9 processor ports. The location of user (DC) device and hence dispenser in the apparatus is thus characterised by a user (DC) device address in combination with a processor port address, both of which are recognised by and programmed into processor 13.

After the hardware making up the system has been installed, the relevant details for each storage area dispenser (e.g. type of storage area, specific location of dispenser, type of brand of beverage at a specific location, unit price of beverage, etc.) are programmed into processor 13, the details being entered against the relevant combination of user (DC) device address and processor port address. As will be appreciated, if details such as the brand of beverage from the Storage area, dispenser or its price subsequently change, such changes can easily be recorded in the software in the processor. A list of authorised users is programmed into each user ID device via processor 13

When the apparatus is in use, the identity of each authorised user is communicated to the processor from each user (DC) device on identification of the user.

Identifications of beverages dispensed from dispensers 10 and 11 are affected by processor 13 by identification of the dispenser in use from details of the user (DC) device address and processor port address, each dispenser is in possession of a unique combination as already mentioned The process of identifying beverages dispensed restocked or removed from secure storage area 17 and dispenser 16 differs from that described for dispenser 10 and 11. It can be appreciated that Secure storage area 17 and dispenser 16 can contain a variety of beverages at any one time, each type of beverage readily identifiable by a combination of it shelf No and tray No, including counting bottles and dispensed beer and lager by a combination of the measured flow and the unit weight.

Therefore identification by processor 13 is based on a combination of information regarding the location the self No. and the tray No. on that shelf, and Keg base platform No and the total unit weight of beverage dispensed communicated directly to the processor from the dispenser and the identity of the dispenser determined in the aforesaid manner. It can, of course, be envisaged that the information regarding the location and total weight of the beverage dispensed may be communicated to the processor via the user (DC) device.

Information regarding the volume of beverage dispensed by dispenser 10 and 11 is communicated to processor 13 via user (DC) device 12. As previously mentioned, equivalent information from secure storage area 17 and dispenser 16 is communicated directly to the processor 13 by-passing the user (DC) device 21. As the unit price of each type of beverage has already been programmed into processor 13, the processor is then able to calculate the total cost of each transaction carried out by each user A bundle of information comprising the identity of the user, the type of beverage dispensed by that user, the volume of those beverages dispensed by the user, and the total cost of the transaction is communicated from processor 13 to cash register 14. When a user wishes to complete a transaction, cash register 14 provides the user with a description of the transaction associated with a user and the total cost on identification of the user by user (DC) device 12. The information is stored electronically within the data base for future reference once the transaction is complete. The user is then free to commence another transaction.

Figure 2:
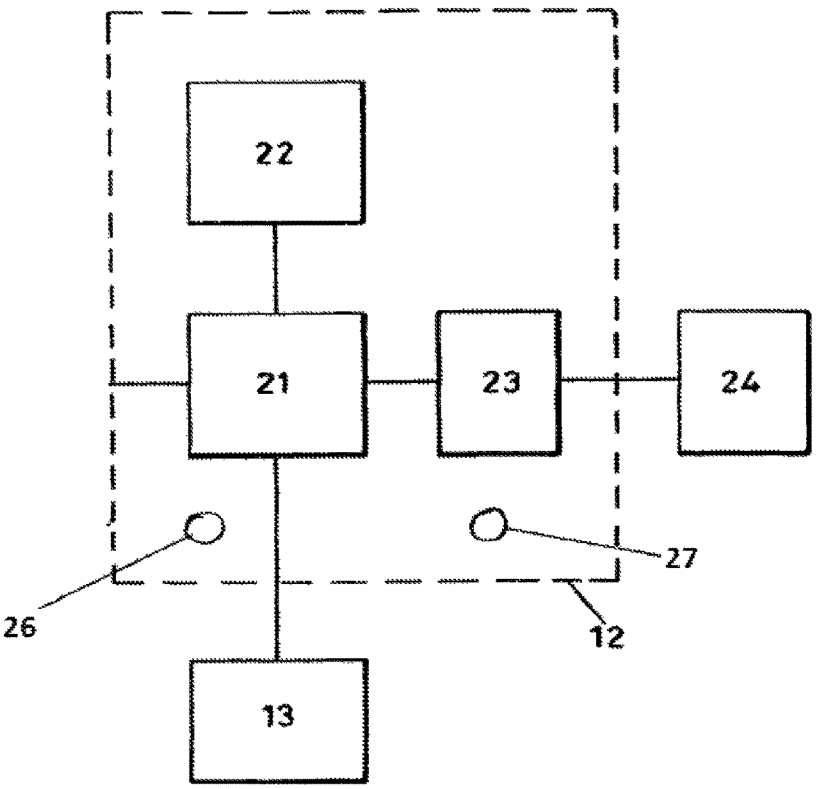
FIG. 2 is a schematic view of a user identification (DC) device.

FIG. 2 illustrates in more detail the user (DC) device 12. Thus, the user (DC) device comprises a receptacle 22 for a personal electronic data carrier, an electronic processor 21, a transistor 23 a red LED 26 and green LED 27 and an electrical circuit connecting the aforementioned elements. Each electronic data carrier carries a unique code identifying the user. In FIG. 2, the receptacle for the personal electronic data carrier is shown as being in close proximity to processor 21, e.g. within the same casing, but it could alternatively be remote from the processor and connected by electrical wiring or other data transmission means. The electronic processor is able to read the code of each electronic data carrier when it is placed in the receptacle and thereby identify the user. The red Led when illuminated indicates the device is healthy and locked. When the data carrier is placed in the receptacle, provided that the data on the carrier is recognised by the electronic processor as being the data for an authorised user of the apparatus, the red LED will be isolated and the green LED will be illuminated indicating the transistor has activated external switch 24, which in this embodiment is a solenoid coil, to which it is attached opening locking device 15. If the data on the carrier cannot be matched to an authorised user, the red LED will remain illuminated and the locking device will not be unlocked. The locking device re-locks on removal of the data carrier from the receptacle and the LED display changes from green to red and it is then transfer of data to processor 13 is undertaken.

In the case of secure area 17 and 16 the operation of the LED is somewhat different whilst the red LED is indicating a healthy supply and locked and green indicates the transistor has activated external switch 24 should the user identifying device be removed from the receptacle 22 prior to the door being closed the red 26 and green LED 27 will continually flash alternately until the door has been securely closed when the flashing will cease a the red LED 26 will remain illuminated, at this point the dispensed data will be communicated to processor 13

In this embodiment, the personal electronic data carrier can be an electronic chip housed in a metal can. Such data carriers are available from Dallas Semiconductor (Texas, USA) as the DS19xx"I" Button series.

Figure 3:
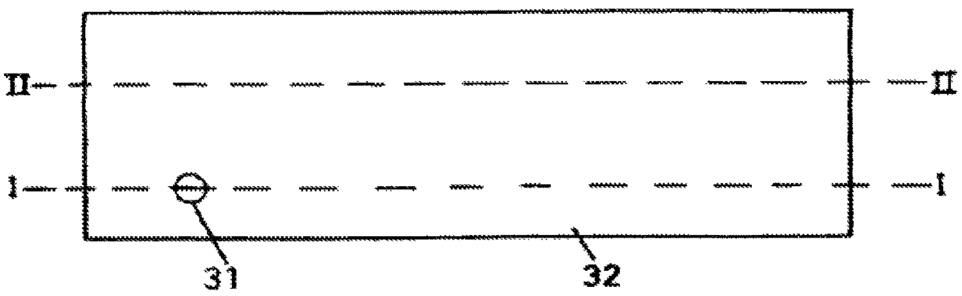
FIG. 3 is a side view of a mechanical locking device comprising two pegs (only one peg shown)
Figure 4:
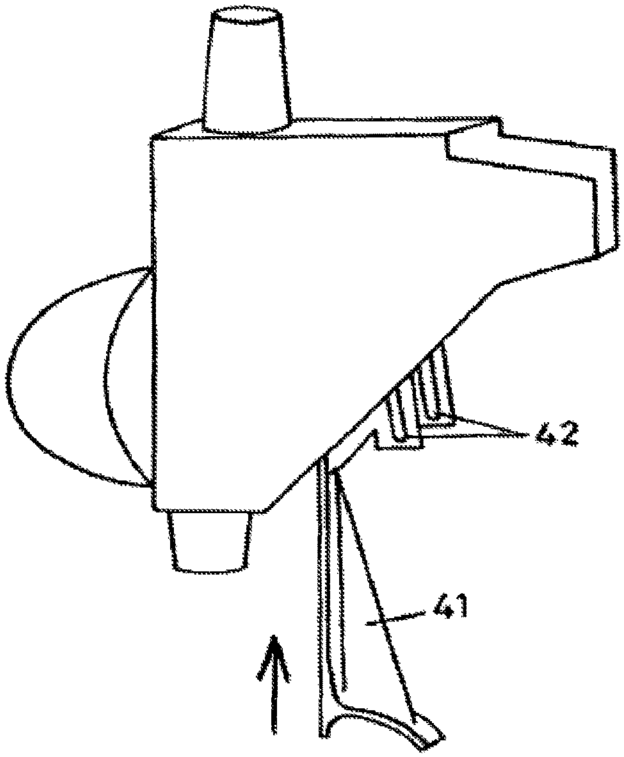
FIG. 4 is a view from and angle of a fixed volume dispenser showing the elongate cut outs at the rear.
Figure 5:
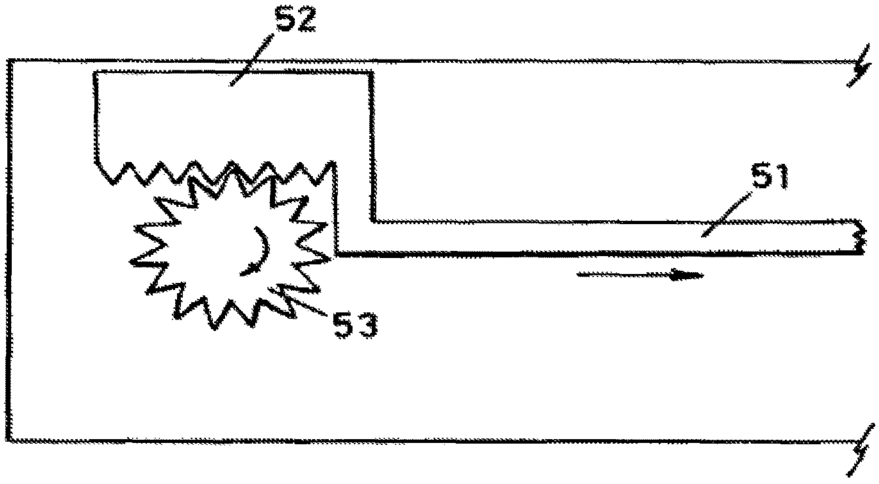
FIG. 5 is a view of a mechanical locking device along plane ⍰ -⍰ -e

The locking device used in conjunction with the optic adaptor 90 for accommodating/housing fixed volume beverage dispenser comprises a mechanical locking device 32 as shown in FIG. 3 comprising two pegs 31 (only one shown) able to insert into the bottom of elongate slots 42 shown in FIG. 4 present on the operating, lever 41 of a typical fixed volume dispenser. With the pegs extend form the body of mechanical locking device 32 they prevent the normal movement of the lever required for dispensing a beverage. FIG. 5 shows the pegs as they appear when engaged within the lever. To disengage from the lever, the pegs retract into the body of mechanical locking device 32 such that the end faces of the pegs are flush with the outside of the exterior wall.

Figure 6:
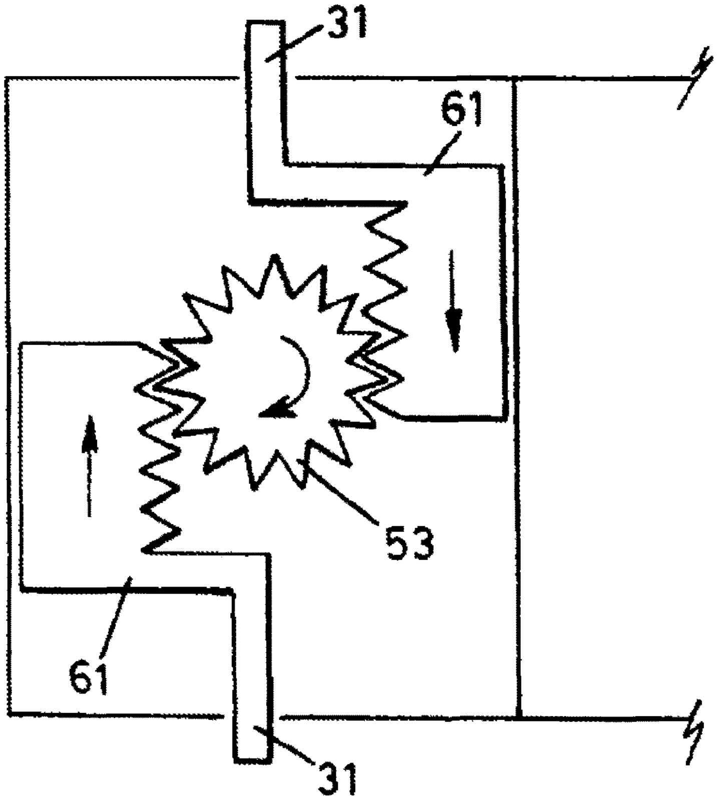
FIG. 6 is a view of a mechanical locking device along the plane ⍰ -⍰.

Mechanical locking device 32 operates via a series of racks and pinions. With reference to FIG. 5, as rod 51 is pulled in the direction shown by the arrow, rack 52, which is directly connected to the said rod, is pulled in the same direction and pinion 53 rotates in a clockwise manner as indicated by the arrow. With reference to FIG. 6, it can be seen that Pinion 53, rotating in a clockwise manner as shown by the arrow, moves racks 61 and pegs 31 attached thereto in opposite directions as indicated by the arrows, resulting in retraction of the pegs into the wall of mechanical locking device 32. By movement of the rod in the opposite direction, it can be seen that the pegs once more protrude from the walls of the mechanical locking device.

Rod 51 is operated by a solenoid (external switch 24) in such a manner that when the data carrier is placed in receptacle 22 and the user identified, the external switch is activated by transistor 23 thereby retracting pegs 31 into the wall of the mechanical locking device.

Thus the normal movement of lever 41 is no longer impeded and the beverage can be dispensed from the fixed volume dispenser. On removing the data carrier, only once the correct information being communicated to processor 13 from switches 91 and 92 will the solenoid coil deactivate and the pegs once again stand proud of the exterior walls of the mechanical locking device and engage the lever of the fixed-volume dispenser rendering it inoperable.

When the dispensing unit is a draught liquid dispenser, such as those typically used for beverages such as draught beer, locking device 15 is a valve located on the feed line. The valve is operated by a solenoid (external switch 24) in such a manner that when the data carrier is placed in receptacle 221 and identified by electronic processor 21, red LED 26 is distinguished and green LED 27 is illuminated and transistor 23 activates the solenoid coil to open the valve.

On removal of the data carrier from the receptacle prior to completing the pouring of the required measure red LED 26 and Green Led 26 will flash on and off alternately the product being dispensed will continue to flow until stopped by closing the Beer tap then the solenoid coil de-activates closing the valve, after a pre-determined time period the processor will close the count ready to be communicated with processor 13 and LED 26 and LED 27 will be reset to the red LED 26 being illuminated if however the same data carrier is placed back in the same receptacle 22 and identified by electronic processor 21, the red LED 26 will be extinguished and Green LED 27 will be illuminated and transistor 23 activates the solenoid coil to open the valve, to continue dispensing the required quantity the count will continue from the last registered count.

When the dispensing unit is a cabinet, locking device 15 is a lock, which in this case is an electromagnetic lock, The lock is operated by a solenoid (external switch 24) in such a manner that when the data carrier is placed in receptacle 22 and identified by electronic processor 21, red LED 26 is distinguished and green LED 27 is illuminated and transistor 23 activates the electromagnetic coil to unlock the door. If the door has not been opened within a specific period and the data carrier is released from its receptacle the green LED 27 will change from being illuminated to red LED 26 being illuminated and the door will be locked.

If the door has been opened and prior to the completion of the dispensing process the data carrier is removed from receptacle 22 the locking device will de-energised the green LED 27 will change from being illuminated to red LED 26 & green LED 27 flashing alternately until the door to the cabinet has been closed the closure of the door is mechanically linked to the electromagnetic locking device which is linked internally to operate a switch located within the structure of the electromagnetic lock, in the closed position the switch provides a positive status report to processor 21, LED flashing will cease and red LED 26 will be illuminated communicating to processor 21 of the completion of the dispensing and informing processor 13 the operator (DC) and quantity of product dispensed. Where there is more than one door fitted each of the cabinet doors are controlled by their own electromagnetic lock (external switch 24) all operating as previously described.

When the dispensing unit is a cabinet FIG. 13 having one or more doors each door has its own user (DC) device 12. When data carrier receptacle 22 is empty, and all red LEDs 26 are illuminated the doors are locked. On placing the date carrier in the receptacle 22 associated with the door to be unlocked the user is identified as being an authorised user, the processor 130 associated with the or that half of the cabinet is instructed by processor 131 to undertake a scan of the contents within the or that half of the cabinet and communicate the data to the processor 130 memory. With the red LED extinguished and the green illuminated. The magnetic coil of the door where user (DC) has been authorised is activated unlocking that door and the beverages dispensed are analysed by processor 130 only the resulting difference is communicated to processor 131 who in turn commits its revised data direct to processor 13.

Figure 9:
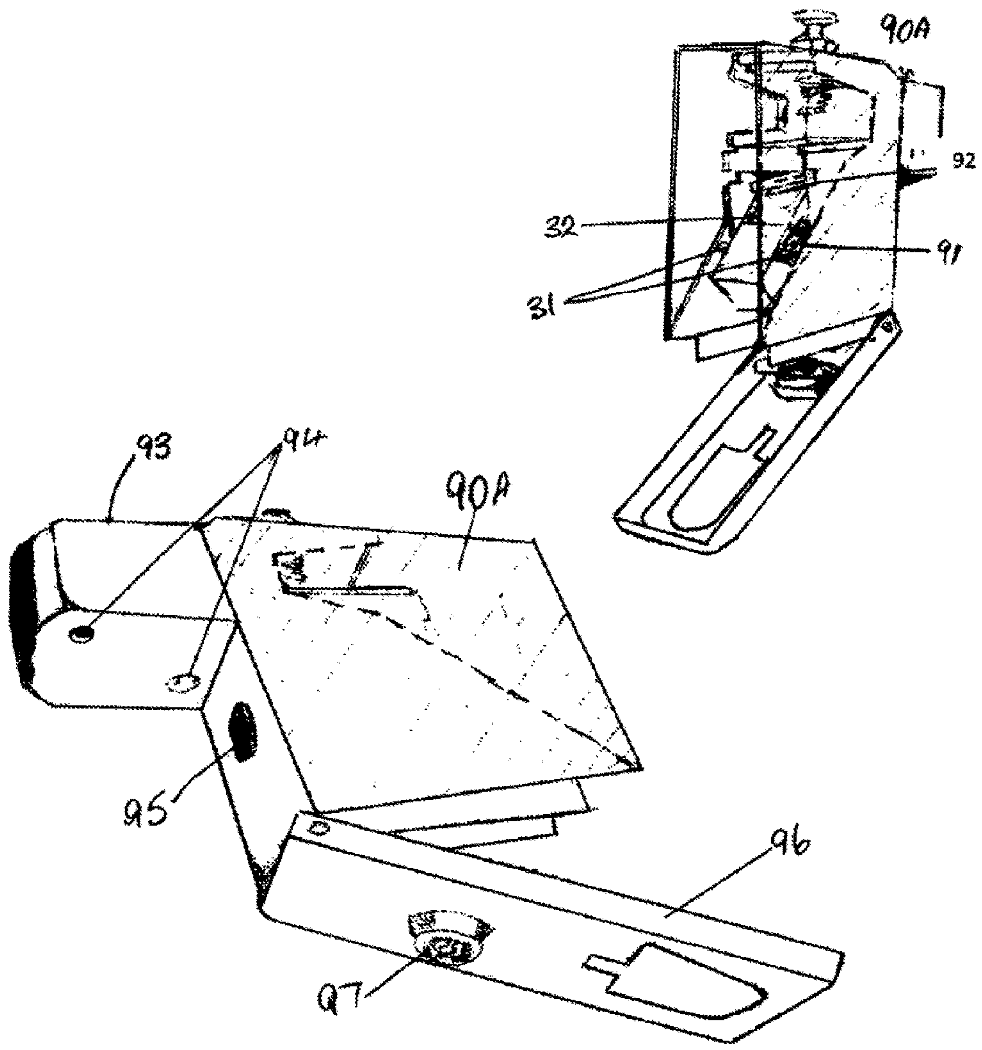
FIG. 9 is a cross sectional of the frontal aspect of the fixed volume dispensers adaptor illustrating the electrical mechanical locking device fixed to a precise location switches ninety one and ninety two for facilitating precise dispensed counts

When the dispenser is a Fixed Volume Dispenser (FVD), it is operated by being located within a fixed position within the housing adaptor 90A FIG. 9 the adaptor which is securely located to a fixing apparatus designed to accommodate the mechanical fixing of the adaptor to a specific location and a race way for accommodating all electrical and electronic cables associated with the adaptor.

At this location provision has been made such that the rear top section of the adaptor has a square shaped projection the has been designed such that it can be inserted into a metal enclosure of the same dimensions as the square projection designed to accommodate two fixing bolts that extend through the bracket through the receptor holes 94 in the square projection of the adaptor, and finally located in threaded holes within the main cable race way which in turn is fixed to the structure of the bar or building.

Also located at a specific point at the rear of the adaptor is a plug 95 situated such that when the adaptor is being pushed into its square bracket for its final fixing location the plug at the rear of the adaptor will be inserted into a socket located in the upright face of the metal wire raceway to enable electrical connection and electronic communication to be afforded.

There are fitted to the adaptor 90A two safeguards to prevent the unauthorised removal of the optic the first is the swivelling locking catch 96 attached to the base of the adaptor that prevents the removal of the optic without the appropriate manually operated key unlocking manual operated locking device97. The second is by locking device 15 which in this case is a solenoid operated device 32, with the solenoid being inoperative pegs 31 interlocked with the internal slides of the optic mechanically locking the optic into place thereby physically preventing the removal of the optic.

Metering the volume of beverage dispensed is by the action of the dispensing operating lever 41 being internally inter connected with mechanical apparatus and micro switches No 91&92.

And is operated in such a manner that when the data carrier is placed in receptacle 22 and identified by electronic processor 21, red LED 26 is distinguished and green LED 27 is illuminated and transistor 23 activates the solenoid coil to open the locking device. For the purpose of providing data on the state of operation during the optic dispensing process two switches 91&92 of the lever operated type with push to close release to open contacts are located in precise locations within the adaptor 90.

Figure 7:
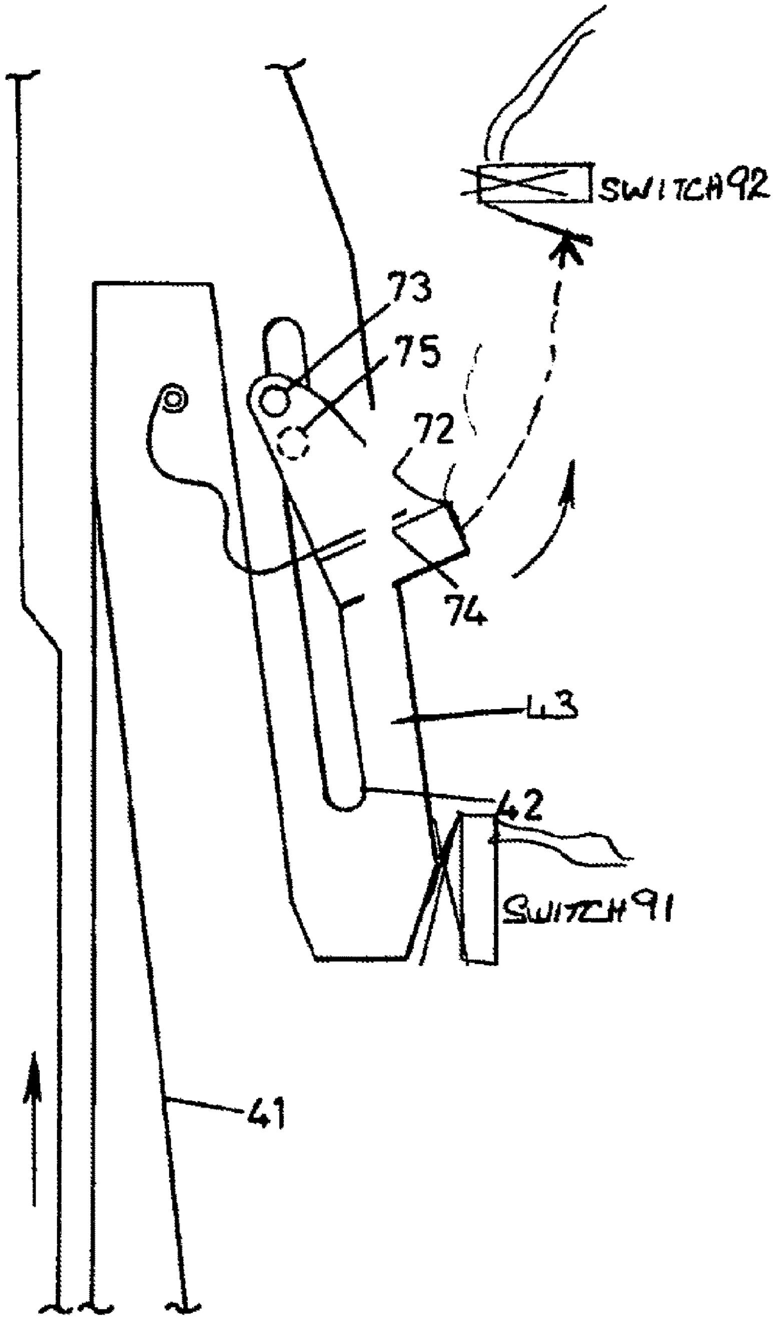
FIG. 7 is a cross sectional view of a fixed volume dispenser illustrating part of the dispenser mechanism
Figure 8:
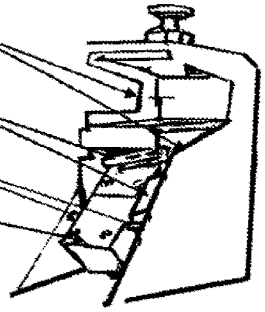
FIG. 8 is the interior section of the side elevation of the fixed volume dispenser's adaptor illustrating parts of the securing and electrical connection facilities.
Figure 8:
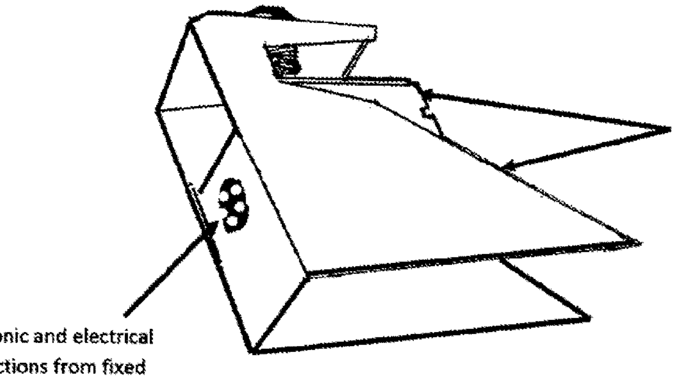

Switch No91 is located to one side of the adaptor 90 in a position where the optic's internal operating slide 43 FIG. 7 is in the non-operating position. With slide 43 in the non-operated position (REST) the slide will apply pressure against the sprung operated lever of switch 91 closing its contacts. Switch No92 is located at the top of the adaptor 90 in a specific location such that when the optic is in the non-operating position at (REST) the switch has no external pressure applied to the sprung operated lever and the switch 92 contacts are opened.

When lever 41 FIG. 7 is moved in the direction shown by the arrow to dispense a beverage, the elongate slots in slide 43 move in the same direction. When slide 43 has travelled sufficient distance to pass switch 91 FIG. 7 pressure applied to the operating levers of switch91 is released thereby opening the switch contacts, Pins 75 FIG. 7 moves towards the base of the elongate slots rotating arm 72, about pivot 73 in an anti-clockwise manner. With fixed volume beverage dispensed arm 72 has travelled to the extremity of its movement having rotated about pivot 73 in the manner shown by the arrow, Switch 92 is positioned such within the adaptor that arm 72 applies pressure against the sprung operated lever closing the switch contacts of switch92.

Having completed the dispensing of the beverage lever 41 is moved in the opposite direction to that shown by the arrow, the elongate slots in slide 43 move in the same direction. When slide 43 has travelled sufficient distance to reach switch 91 pressure is re-applied to the operating levers of switch 91 thereby closing the switch contacts, Pins 75 move towards the top of the elongate slots rotating arm 72, about pivot 73 in a clockwise manner.

With volume beverage dispensed arm 72 at the extremity of its movement having rotated about a pivot 73 in the opposite manner shown by the arrow, Switch 92 is positioned such within the adaptor that arm 72 no longer is applying pressure against the sprung operated lever thereby opening the switch contacts of switch92.

Switch 91 changes state when switch contacts change from being closed to being in the open position the information transferred to the processor 13 is that the status report changes from positive with the switch 91 contacts closed to negative therefore indicating the optic has commenced its dispensing cycle of releasing the product.

When switch No92 is open in the normal state the information to the processor 13 is that the status report is negative and therefore the optic is not yet fully opened.

When switch No 92 contacts changes from being open to being closed the information transferred to the processor 13 is that the status report has changed from negative to positive therefore indicating the optic is now fully opened and the product is/has been released.

Therefore the full sequence of operation is as follows:

Data carrier is inserted to receptacle 22 and identified by electronic processor 21, red LED 26 is distinguished and green LED 27 is illuminated and transistor 23 activates the solenoid coil to electrical locking device 34 located within adaptor retracting locking pins Switch 91 closed—processor status report positive optic not in use at (REST).

Optic is manually operated By Bar person to dispense liquid

Switch 91 opened—processor 13 status report negative optic dispensing process commenced.

Switch 92 opened—processor 13 status report negative optic not fully opened.

Switch 92 closed—processor 13 status report positive optic fully open and now dispensing liquid.

Switch 92 opened—processor 13 status report negative optic now starting to close.

Switch 91 closed—processor 13 status report positive optic closed dispensing complete.

The combination of the two switch action has been designed to ensure accuracy of counting and preventing premature release of the locking device pins.

The embedded software design is such that only when the data carrier is removed from the adjacent receptacle 22 of the electronic device will the locking device be de-energised and the processor will release the bar person name and the count quantity dispensed to processor 21 which is then communicated to processor 13.

If the data carrier is released from its receptacle prior to the completion of the dispensing process the locking device will remain energised however the green LED 27 will change from being illuminated to red LED26 & green LED27 flashing alternately until Switch 91 is in the closed position giving a positive status report to processor 21, LED flashing will cease and red LED26 will be illuminated communicating to the processor 21 to de-energise the locking device and inform processor 13 the operator ID and quantity of product dispensed.

Should the Data carrier be retained in its receptacle after dispensing the first liquid count the locking device will remain energised awaiting removal or for the dispensing operation to proceed for a further dispensing operation.

The invention of the adaptor is intended to overcome the ability of unauthorised removal of the optic from its housing.

To remove the optic from the adaptor FIG. 9 device 90A for the replacement of an empty bottle or and routine cleaning can only be accomplished by utilising the correct higher authority data carrier this recognises that the optic is being removed for cleaning/maintenance purposes or the changing of an empty product for a full one when the locking device will remain energised or if the (DC) is removed from the receptacle will re-energise once the (DC) is reinserted into the receptacle. Failure to adopt this procedure will result in the locking device 34 being de-energized release the two locking pins from within the barrier wall protruding externally preventing the optic being reinstated within the adaptor.

Two safeguards prevent the removal of the optic the first is the swivelling locking catch 95 attached to the base of the adaptor that prevents the removal of the optic without the appropriate manually operated key being inserted into locking FIG. 9 device 97.

Whilst it is recognised that unauthorized access to the key is possible the second safeguard is the electronic locking device 34 would require authorization through the use of a data carrier to unlock the optic prior to being removed from the adaptor.

Whilst it is reasonable to conclude people with access to data carriers during their working period when inserting it into its receptor will disengage the lock 34 from the optic as is required when dispensing the product could also have access to a key that will release the swivelling locking catch 96. Therefore be able to remove the optic from the adaptor and illegally releasing the product by up righting the bottle removing the optic from the bottle releasing the product then replacing the bottle onto the optic replacing the optic without anyone's knowledge.

Switch No91 has been utilised for confirmation of the completion of product dispensed and therefore an accurate count and a release of the locking device. A second feature is to provide a status report to the processor every 250 milli seconds, if the status returned is positive no further action is taken should however the status report return negative as is the case when the optic has been removed and if the further required data has not been forthcoming within a timed period of 3 seconds when the green LED 27 will change from being illuminated to the red LED26 & green LED 27 flash alternately the power to the locking device 34 is de-energised thereby releasing the locking pins preventing the optic being refitted back to the adaptor housing.

This action can only be brought about by the insertion of a data carrier into the receptacle on the electronic device 22 and switch91 contacts changing from closed to open as a result of the optic lever pressure being removed, resulting in a negative status report being received at the processor 21 a negative status report automatically starts an internal timer within the processor which is terminated once the processor receives data from switch92 that is contacts changed from open to closed changing a negative, status report to a positive status report.

Should after three seconds this data not be forthcoming power to the locking device is disconnected releasing the locking pegs 31 preventing the optic being returned to its normal working position the situation can only be rectified by the removal of the optic and resetting the electrical locking device 34 by a higher authorization data carrier being inserted.

Three seconds has been proven to be adequate time for the normal dispensing action measured from the start of the barperson pushing the optic lever vertically to the arrival at the top of the movement for the release of the liquid, but is insufficient time for the unauthorised removal and replacement of the optic.

The use of the higher authorized data carrier to reset the electronic locking device 34 is to enable the correct authority to identify the reason for the misuse of the optic.

When the dispensing unit is a cabinet, the volume of beverages dispensed is also metered. To accommodate this feature specifically designed support shelves are fitted into the cabinet. Each shelf accommodates a number of specifically sized individual trays, each tray is secured to the shelf by one or more specifically designed weighing devices, weighting devices associated with an individual tray are connected via electrical wired connections or other means and the varying voltage created by the removal or addition to the tray of a product is detected by electronic processor 130 this voltage is stored as a digital format and relayed to processor 131 on demand.

Upon the removal of the data carrier giving an indication that the completion of the dispensing of beverage has taken place as a result of the door being closed and the locking device being able to mechanically reset a signal is sent to processor 131. If after a pre-set period of the data carrier being removed the reset signal is not received both red and green LEDs will commence alternate flashing and continue until the door has been securely closed Should the cabinet have more than one door in order that the interior of the cabinet can continue this division for identification of product location the shelf is electronically constructed such that each half of the cabinet is segregated through the use of two processor 130 each half will thereby accommodate a specific number of individual trays in specific locations relative to the shelf location being communicated with a specific processor 130.

The data collected by processors 130 is transferred to a central processor 131 which communicates to processor 13 A suitable weighing device can be an analogue or digital load cell. Each load cell is able to measure differences in weight, thus the removal of any beverages from any of the trays is immediately detected by the load cells and communicated to its respective processor 130.

When the dispensing unit is a secure area 17 FIG. 14, the volume of beverages put in place removed or dispensed are also metered. To accommodate this feature a plurality of Floor Mounted Weighting Devices based trays are employed to accommodate a plurality of bulked storage beer and lagers containers product being dispensed from any of the bulk storage containers will result in a change in the weight this change is detected by processor 170 which in turn communicates the results to processor 171 and forwarded to processor 13, on demand data communicated from the flow meter located adjacent to the dispensing tap associated with that product dispensed is communicated to processor21 and is then communicated to processor 13 to cross correlate the results and confer both readings concur with the results.

A plurality of storage racks fitted with height adjustable shelves all with Rack Weighing Devices of specific design secured to the shelves, the weighting device are in turn secured to individual trays provides varying voltages created by the removal or addition of products are identified to the specific shelf and tray, located at a specific location communicated to electronic processor 170 via electrical wired connections or other means this voltage is stored as a digital format and communicated to processor 171 and communicated on demand to processor 13 the changes detected will be used as data for the updating of the data base and used as an audit trail for restocking and depletion of produces.

When the dispensing unit is a Multi-Stacked Container Dispensing Apparatus unit10 FIG. 12 for draught dispensing, such as those typically used for bulk delivery of beverages such as draught, fruit juice sodas Wine etc., a locking device 15 is an isolating valve located in the feed line adjacent to the serving tap. The isolating valve is operated by a solenoid (external switch 24) in such a manner that when the data carrier is placed in receptacle 22 and identified by electronic processor 21, red LED 26 is distinguished and green LED 27 is illuminated and transistor 23 activates the solenoid coil to open the isolating valve on the main feed line. Product delivered to the serving tap through the pipelines will be measure by the use of a flow meters device 16 being fitted adjacent to the isolating valve.

Each Multi Stacked Container Dispensing Apparatus (MSCDA) FIG. 12 is designed to delivered a specific beverage from a plurality of beverage containers each being inserted into receptors attached to the (MSCDA) to each receptor is connected an isolating valve fitted with a flow meter each receptor is designed to enable a product container having a (CSLD) 107 attached to be inserted into the receptors when the plurality of product containers are fitted to the (MSCDA) deliveries of its specific beverage is routed through the receptors isolating valve and flow meter located within the structure of the (MSCDA) including a series of pipes that are connected to the outlet of each (MSCDA) therefore the (MSCDA) can be located adjacent to the serving tap or remotely, A (MSCDA) will have a plurality of containers attached; If the product is delivered in a container form to enable the product to be dispensed from the (MSCDA) it will have attached at the container outlet FIG. 10 the Container Stop Locking Device (CSLD) 107 preventing release of the product even when the container is inverted.

The (CSLD) is designed to accommodate an extended tubular apparatus 101 which will be inserted into the opening of the product container and submersed to the bottom this will reduce the resistance of air entering the container by delivering the air directly to the base of the container increasing the flow rate of the product being extracted from the container. To avoid a product being adversely effected by the introduction of air this apparatus will comprises a tube secured to the inlet air device 102 of the (CSLD) to which at the other end of the tube is attached a device which accommodates a compressed transparent container 103.

This accommodating device 104 is positioned onto the end of the tube taking care that the air sealing apparatus 105 surrounding the tube and attached to the base of the device is not to damage. It is intended the tube be insert through the sealing apparatus 105 to a point where the tube is protruding through the accommodating device 104 and is visible within the transparent container 103 that is still at this point compressed into the accommodating device.

This is to ensure the transparent container 103 will be encasing the end of the tube101 in such a manner that the transparent container will collect air being drawn in from the outside atmosphere through the tube101 into the transparent container 103 when the product is being dispensed, isolating/arresting the drawn in air from the product thereby preventing the air contamination of the product. With the continuation of air being drawn in during the dispensing of the product and being received into the transparent container the container will begin to expand and in so doing will be gradually extracted/released from the accommodating device.

With the continual expansion of the transparent container filling the spaced left at the bottom of the product container it will begin to exert pressure onto the accommodating device such that the accommodating device 104 begins to travel up the tube replacing the vacant space created by the extracted product with transparent container filling with air until such times as the product has been emptied and the transparent container has been expanded to fill the interior space of the product container.

Air routed through the inlets 102 positioned either side of the (CSLD) sliding bottle stopper 106 is routed down and through the base centre of the (CSLD) sliding container stopper 106 Product released from the outlet of the bottle is routed through orifices created around the air inlet device at the base of sliding bottle stopper 106.

Container Stop Locking Device (CSLD) 107 is designed to be attachable to the neck of either a container that employs a screwing top as a stopper FIG. 11 or a cork as a stopper FIG. 12. The (CSLD) 107 and outer securing ring 108 are placed over the top of a container neck and pushed down in the direction of the arrow until the teeth on the end of expanding spring fingers 109 which extend from the base of 107 are locate around and into the moulded recess formed into the neck of the bottle, this recess is located beneath the end of the threaded portion when the stopper is a screw fixing seal FIG. 11 item 11*a*. Or alternately when the stopper is a cork located below the enlarged portion of the moulding FIG. 12 item 12*a*.

Figure 10A:
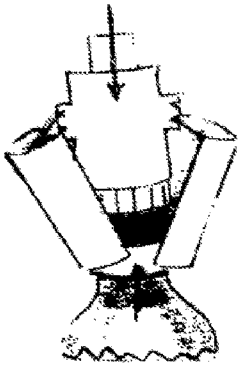
FIG. 10 is a view of a sealing adaptor top for fitting to a screwed or cork topped container and for creating an environment within a container where air drawn in is separated internally from the product.
Figure 10B:
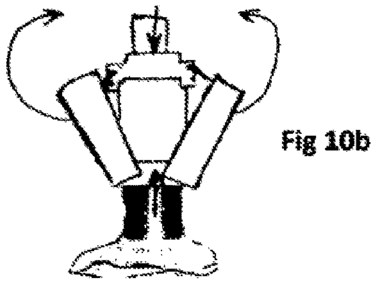
Figure 10C:
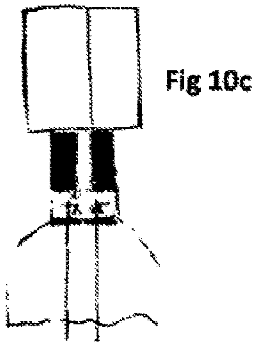
Figure 10:
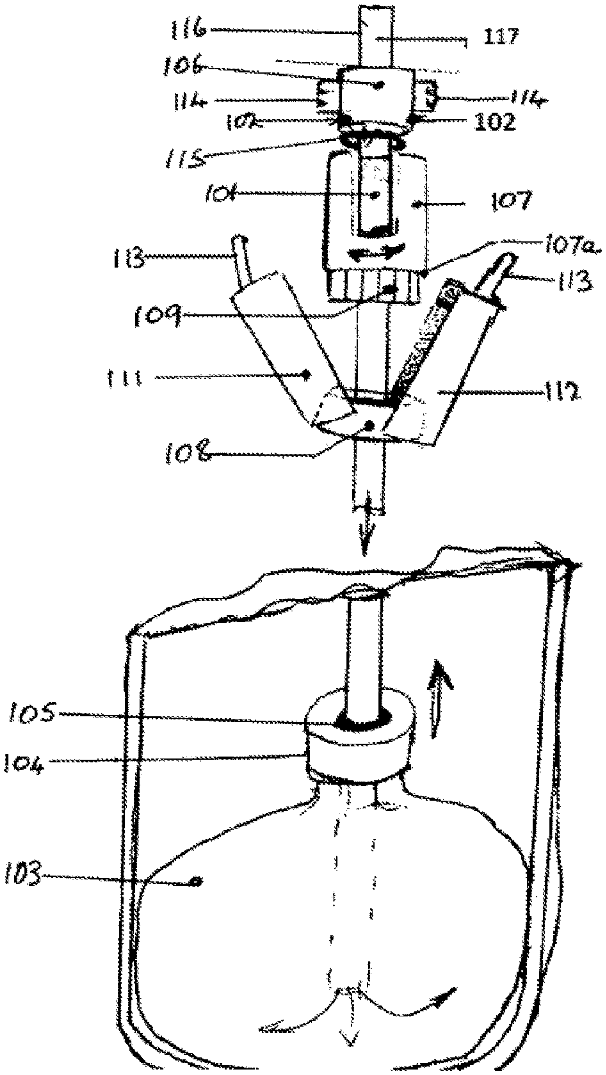

When (CSLD) 107 is in position as such that the (CSLD) locking device flexible fingers 109 teeth have a secure grip around and into the neck recesses as shown in FIG. 10*a* the outer securing ring 108 is pulled up over the flexible fingers 109 as shown in FIG. 10*b* in the Direction of the arrow to a point where the extended fingers form part of the main assembly (CSLD) 107 this recess 107*a* will form the stopping point for the outer securing ring 108 preventing the outer securing ring 108 being dislodged by upward pressure.

With the outer securing ring 108 securely located over the flexible fingers whose teeth grip around the container recess 11*a* or alternatively 12*a*, preventing the flexible fingers from opening outwardly and releasing their grip on the neck recess when being exerted to the upward pressure created by the action of the sliding bottle stopper 106 being secured into position. In other words pressure being exerted in the opposite direction to the arrow pointing downwards.

Attached to the outer securing ring 108 are two semi-circular swivelling extended hand operated closing apparatus 111 and 112 further detailed FIG. 11*b* such that when closing they swivel in the direction of the arrows.

Attached to apparatus 111 and 112 are mechanical loops 113 and further detailed FIG. 11*d* that also swivel in the direction of the arrow when being closed or in the opposite direction when being opened, which are in turn connect to the bottle stop adjusters 114 located either side of the sliding. Container Stopper 106 the purpose of these apparatus is to enable the difference in distance that exists between the top of the container and recess of a screw top and the top of the bottle and the recess of a cork top to be manually adjusted.

When the sliding container stopper106 which has a rubber seal fitted to its base 115, is positioned over the top of the bottle outlet, the sliding bottle stopper 106 is designed such that the force being exerted by the action of the two semi-circle extended hands operated apparatus being closed.

Manual hand operated squeezing action applied to apparatus 111 is closing in the anti-clock wise direction and 112 is closing in the clock wise direction causing the mechanical loops 113 which were located below the bottom of the container stop adjusters at the commencement of the sealing process With the continual rotation of 111 and 112 the mechanical loops 113 become extended above the top of the container stop adjusters 114 thereby applying a downward force onto the sliding container stopper 106 such that the seal 115 at the base of the bottle stopper 106 is forced against the top of the mouth of the container sealing in the contents.

The continual manual squeezing action of the two semi-circle extended hand operated closing apparatus 111 and 112 continues to a point where the vertical point of balance between the container stop adjusters 114 and the mechanical loops 113 attached to the extended hand operated closing apparatus 111 and 112 has been exceeded.

At this point the forces being exerted between the flexible fingers 109 teeth locked into the recess of the container neck of FIG. 11*a* or alternatively FIG. 12*a* securely locked in place by the outer securing locking ring 108 and the two semi-circle extended hand operated closing apparatus 111 and 112 and the container stop seal 115 sitting upon the top of the container opening is no longer being increased.

Having now past the point of balance the continual rotation is now automatic and pressure is reducing until the extended hand operated closing apparatus 111 and 112 are physically prevent from rotating further by striking the structure of the bottle stopper assemble thereby creating a mechanically secure watertight fixing to the top of the container opening.

At the top of the container stop is a round male projecting section 116, fitted within this assemble is a manually operated sprung release valve 117, incorporating sealing device 118.

In the normal position the valve is closed preventing release of its contents when the container is being rotated such that the base is uppermost, the valve117 is only activated by the projecting assemble being inserting down into the extended spout of a female receptor. Each female receptor is fitted with means of capturing any escaping liquid.

With the (CSLD) 107 being fully inserted against a stop fitted in the base of the female receptor the manually operated sprung valve 117 will be opened releasing the product.

In the event the container should need to be removed from the female receptor prior to the container being empty once the container is released from the stop the internally fitted spring value117 will immediately close preventing any further release of product from the container.

To ensure the product will only be released from the container when the container is located in the female receptor each female receptor is mechanically attached to an electrically operated solenoid valve with a flow metering device attached at the outlet.

With the data carrier being placed into the receptacle 22 of a specific product and the user (DC) being authorised by processor 22, red LED 26 is distinguished and green LED 27 is illuminated and transistor 23 activates the solenoid coil to open the isolating valve Device 15 on the main feed line next to the serving tap.

Processor 22 communicates to processer 126 located within the structure of the (MSCDA) requesting the release of the product to be dispensed. Within the structure of each (MSCDA), is fitted also a processer 124 and a plurality of transistors. Processor 126 will communicate to processor 124 requesting initiation of the first of a Plurality of transistors 23 associated with each of the Plurality of solenoid valvesdevice15.

The activation of each solenoid valve Device 15 located within the structure of the (MSCDA) will be undertaken in numerical order starting at the lowest number available the transistor Device23 associated with the first solenoid vale device 15 attached to the base of the first receptor is energised its outlet is connected to a flow metering device16 which has its outlet connected to a common manifold which in turn is connected to a pumping device.

Measurements from each metering device16 is communicated to processor 124 and when the flow measurements determine the content of the duty product container has been reduced to 5% the processor 124 will energise the transistor 23 associated with the solenoid valve15 connected to the next beverage bottle and the metering device 16 attached to this valve will meter the quantity of product flowing to the common manifold at the same time communicating with processor 124.

Product Container No1 flow data being collected at the same time from the metering device attached to valve No1 will continue to communicate with Processor 124 and when the count is finalised or alternatively a no flow signal is detected the valve is deactivated.

At the same time as the processor initiated the release of the beverage the pump associated with delivering beverage released from the product containers is energised by a transistor initiated at the same time as the release of the first container it is pumped to the delivery line through a 2nd flow metering device located adjacent to the dispensing tap and its data is communicated with processor 22.

With the data carrier removed from the receptor or the dispensing tap being closed the pump and the duty valve at the base of the duty product container will be de-energised ensuring the beverage not released from the container will be captured.

The quantity of product dispensed will be individually metered by a metering device attached to the isolating vale attached to each female receptor, monitoring the quantity of beverage dispensed enables the system to identify the volume of product held in the container.

When the product has been depleted to approximately 5% of the total, processor 126 will organise the energising of the valve associated with the next bottle ensuring a continual flow of the product release, when the system detects the first container has been fully emptied monitored by the count or the detection of a no flow signal at any time during dispensing the valve will be isolated preventing the introduction of air into the system supply routes or a failure in the product supply.

To monitor that the beverage being dispensed the volume being released from the (MSCDA) has attached a weighing device. Measuring the volume and monitoring the reduction in weight when combined with the measured flow quantity will provide accurate volumes dispensed.

(MSCDA) dispensing specific brands and will be located at specific locations throughout the sales area and will be identified by their specific locations.

Alternative individual (MSCDA) in the form of a cabinet that contain only weighting devices to measure only the weight of the product to determine product containers being removed or replaced will be located at specific locations throughout the sales area and will be identified by their specific locations.

Inserting a data carrier into receptor 22 will initiate a process of investigation which will take place within the processor and will initiate acceptance or refusal for access to the dispenser.

On removal of the data carrier from the receptacle prior to completing the pouring of the required measure red LED 26 and Green Led 26 will flash on and off alternately the product being dispensed will continue to flow until stopped by closing the outlet tap and the solenoid coil de-activates closing the valve.

After a pre-determined time period the processor will close the count ready to be communicated with processor 13 and LED 26 and LED 27 will be reset to the red LED 26 being illuminated if however that data carrier is placed back in the same receptacle 22 and identified by electronic processor 21, the red LED 26 will be extinguished and Green LED 27 will be illuminated and transistor 23 activates the solenoid coil to open the valve, to continue dispensing the required quantity the count will continue from the last registered count.

Several fixed volume dispensers, draught liquid dispensers or cabinets, can be connected in series via a RS 485 communications bus to one processor port The invention may optionally comprise a plurality of cash registers. A further option is a cash register 14 able to identify each note and coin placed therein and removed by provision of, for example, weight cells attached to every note and coin tray. The cash register is thus able to verify that the correct amount of cash is placed in and removed from the cash register thereby reducing error and fraud.

Each user could also be provided with one or more display units 18, operatively linked with processor 13 that provides to the user and any person being served by the user a description of the transaction associated with the user and the total cost both during and on settlement of the transaction.

Another option is the provision of a timer delay for draught liquid dispensers which maintains the solenoid coil (external switch 24) activated for a pre-set period after removal of the data carrier from receptacle 22. The period of delay allows a pre-determined amount of over-fill when dispensing beverages such as beer that are characterised by a foaming head.

Further processors may be provided as a back-up for processor 13.

It will readily be apparent that numerous modifications and alterations could be made to the apparatus described and shown in the drawings without departing from the principles underlying the invention and all such modifications and alterations are intended to be embraced by this application.

The invention claimed is:

1. Apparatus for controlling and monitoring the storage and dispensing of beverage products; the apparatus comprising:

a plurality of product registration devices for registering the presence of beverage products in one or more secure store rooms, each product registration device being associated with one beverage product or a group of linked beverage products;

a plurality of metering dispensers in a sales location from which one or more authorized users can dispense beverage products to customers;

a plurality of 1st instance locking devices for preventing dispensing of a beverage product, each 1st instance locking devices being operatively linked to a different one of said metering dispensers;

one or more 2nd instance locking devices for controlling access to the one or more secure store rooms, each 2nd instance locking device being associated with one of the one or more secure store rooms;

a plurality of user identifying devices for identifying authorized users, each user identifying device being operatively linked to a different one of said 1st instance and 2nd instance locking devices so that an authorized user can unlock the said 1st instance locking devices and thereby dispense a beverage product from an operatively linked metering dispenser or, by unlocking a 2nd instance locking device, can enter one of the one or more secure store rooms; and a processor which receives and processes data from the said product registration devices, the user identifying devices and the metering dispensers and records the placing of beverage products in the one or more secure store rooms, the removal of beverage products from the one or more secure store rooms, the dispensing of beverage products from the metering dispensers by authorized users, and calculates the total value of each customer transaction made by each authorized user;

wherein each of the plurality of product registration devices comprises a tray in one of the one or more secure store rooms upon which the beverage product or group of linked beverage products is located, the tray having an associated weighing device which registers the weight of the beverage product or group of linked beverage products and detects removal of the beverage product or group of linked beverage products from the tray and transmits to the processor information enabling the processor to determine the quantity and type of beverage correlated with the addition of beverage products to one or more of the metering dispensers; and wherein each of the beverage products or group of linked beverage products has its own tray.

2. An apparatus according to claim 1 which comprises a cash register operatively linked to the processor which receives the calculated total value of each customer transaction made by each user, and wherein the cash register has a user identifying device operatively connected thereto, the cash register being arranged to display the calculated total value of each said customer transaction upon identification of an authorized user by the device.

3. Apparatus according to claim 1 wherein the metering dispensers are selected from:

(i) fixed volume spirits dispensers;
(ii) draught beverage dispensers;
(iii) temperature-controlled cabinets; and
(iv) ambient cabinets.

4. Apparatus according to claim 1 wherein the weighing device comprises an analogue or digital load cell or strain gauge.

5. Apparatus according to claim 1 wherein the user identifying device comprises a reader device for an electronic, optical or magnetic data carrier.

6. Apparatus according to claim 1 wherein at least one of the plurality of metering dispensers comprises a fixed volume spirits dispenser and the 1st instance locking device comprises an electro-mechanical locking device, wherein the electro-mechanical locking device is held within an adaptor which is removably connected to the at least one metering dispenser.

7. Apparatus according to claim 6 wherein the electro-mechanical locking device comprises a locking element for engaging a dispensing arm or lever of the fixed volume dispenser to restrict movement thereof and prevent dispensing of the beverage, the locking element being actuable when a user is identified by the user identifying means to disengage the dispensing arm or lever of the dispenser to permit dispensing of the beverage.

8. Apparatus according to claim 7 wherein the locking element is actuable by means of a solenoid.

9. Apparatus according to claim 6 wherein the electro-mechanical locking device comprises a housing and means for lockably attaching the housing to the fixed volume spirits dispenser; the housing containing an electromechanical locking element for engaging a dispensing arm or lever of the fixed volume dispenser to restrict movement thereof and prevent dispensing of the spirits, the electromechanical locking element being actuable when an authorised user is identified by the user identifying device thereby to disengage the dispensing arm or lever of the dispenser to permit dispensing of the beverage.

10. Apparatus according to claim 9 wherein the electro-mechanical locking device is provided with electronic communication means for communicating with the processor of the apparatus, and a plurality of switches which are opened or closed in response to movement of the dispensing arm or lever of the fixed volume dispenser and wherein the opening and closing of the switches generates signals which are transmitted via the electronic communication means to the processor and which indicate the volume of spirits dispensed from the dispenser.

11. Apparatus according to claim 10 wherein the electro-mechanical locking device is provided with a pair of switches, one at either end of a range of movement of the dispensing arm or lever or an element mechanically coupled thereto, which indicate when a required volume of spirit has been dispensed.

12. Apparatus according to claim 1 wherein the metering dispensers comprise a dispensing cabinet for containing beverage products, the dispensing cabinet having one or more shelves therein, each shelf having attached thereto or mounted thereon a plurality of trays each tray having associated therewith a weighing device for detecting removal of a beverage product from the tray.

13. Apparatus according to claim 12 wherein the dispensing cabinet comprises or is operatively connected to means for identifying the location of a said tray and the identity of beverage product stored thereon and for determining from a change in weight on the said tray when a beverage product has been removed from or added to the tray.

14. Apparatus according to claim 13 wherein the detecting weighing device comprises an analogue or digital load cell or strain gauge.

15. A beverage storing and dispensing system comprising:

an apparatus for controlling and monitoring the storage and dispensing of beverage products; the apparatus comprising:

a plurality of product registration devices for registering the presence of beverage products in one or more secure store rooms, each product registration device being associated with one beverage product or a group of linked beverage products;

a plurality of metering dispensers in a sales location from which one or more authorized users can dispense beverage products to customers;

a plurality of 1st instance locking device for preventing dispensing of a beverage product each 1st instance locking device being operatively linked to a different one of said metering dispensers;

one or more 2nd instance locking device for controlling access to the one or more secure store rooms, each 2nd instance locking device being associated with one of the one or more secure store rooms;

a plurality of user identifying devices for identifying authorized users, each user identifying device being operatively linked to a different one of said 1st instance and 2nd instance locking device so that an authorized user can unlock the said 1st instance locking device and thereby dispense a beverage product from an operatively linked metering dispenser or, by unlocking a 2nd instance locking device, can enter one of the one or more secure store rooms; and a processor which receives and processes data from the said product registration devices, the user identifying devices and the metering dispensers and records the placing of beverage products in the one or more secure store rooms, the removal of beverage products from the one or more secure store rooms; and the dispensing of beverage products from the metering dispensers by authorized users; and calculates the total value of each customer transaction made by each authorized user; and a stock of beverage products, the stock of beverage products being recorded in an inventory stored on an electronic storage device or medium associated with the processor, a proportion of the stock of beverage products being stored in the one or more secure store rooms and a proportion of the stock being connected to the plurality of dispensing devices;

wherein each of the beverage products forming the proportion of the stock in the one or more secure store rooms is located on a tray having an associated weighing device which registers the weight of the beverage product and detects removal of the beverage product from the tray and transmits to the processor information enabling the processor to determine the quantity and type of beverage products removed from the tray correlated with the addition of beverage products to one or more of the metering dispensers; and wherein each of the beverage products or group of linked beverage products has its own tray.

* * * * *